United States Patent [19]
Cramaro

[11] 4,189,178
[45] Feb. 19, 1980

[54] TARPAULIN COVER SYSTEM

[76] Inventor: Nello Cramaro, 779 York Rd., Hamilton, Ontario, Canada

[21] Appl. No.: 1,036

[22] Filed: Jan. 4, 1979

Related U.S. Application Data

[63] Continuation of Ser. No. 729,237, Oct. 4, 1976, abandoned.

[30] Foreign Application Priority Data

Jan. 29, 1976 [CA] Canada .................................. 244497

[51] Int. Cl.² ............................................. B60J 7/00
[52] U.S. Cl. .................................. 296/105; 296/100
[58] Field of Search ............... 296/98, 100, 101, 104, 296/105, 109, 137 R, 137 B; 105/377; 4/172.12, 172.14; 160/84 R

[56] References Cited
U.S. PATENT DOCUMENTS

| 2,757,042 | 7/1956 | Schultz | 296/100 |
| 3,500,895 | 3/1970 | Silvernail | 296/105 |
| 3,560,045 | 2/1971 | Finneman | 296/137 B |

FOREIGN PATENT DOCUMENTS 939418  1/1974  Canada ................................... 296/105

*Primary Examiner*—Joseph F. Peters, Jr.
*Assistant Examiner*—Randall A. Schrecengost
*Attorney, Agent, or Firm*—Ladas, Parry, Von Gehr, Goldsmith & Deschamps

[57] ABSTRACT

A tarpaulin cover system for use in trucks eliminates the need for usual side tracks for guiding the tarpaulin supporting rods. The rods are instead guided by flexible means such as cables which are simultaneously used for driving the front edge of the tarpaulin when unfolding or folding same. The invention substantially enhances the operative reliability of the device, reduces costs thereof and simplifies its installation.

4 Claims, 7 Drawing Figures

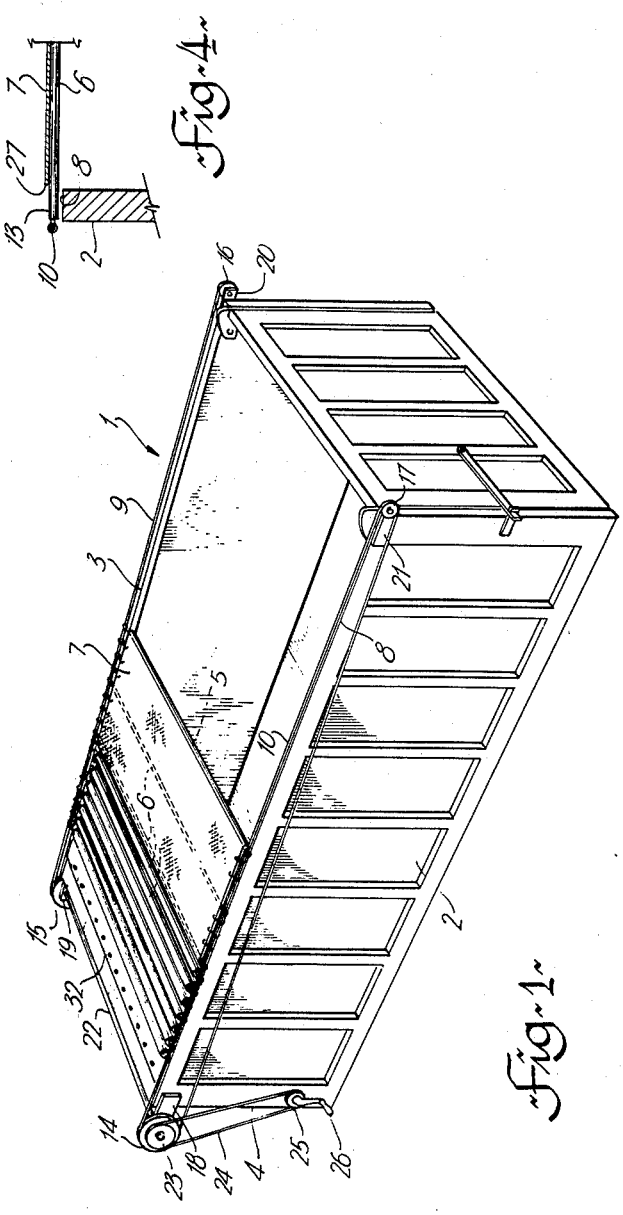

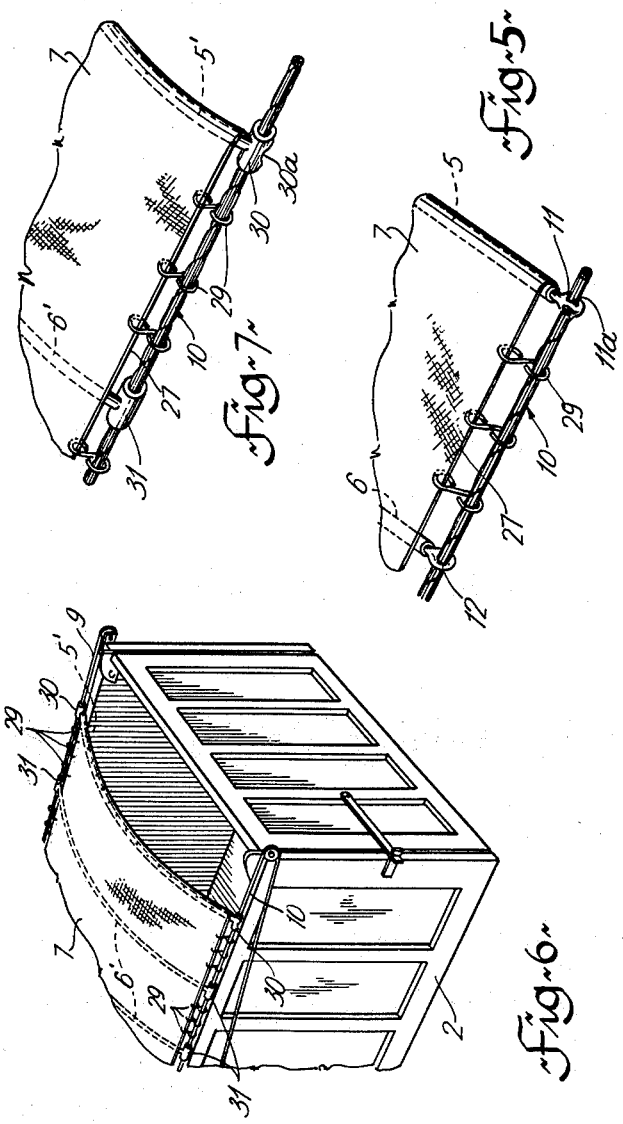

TARPAULIN COVER SYSTEM

This is a continuation of application Ser. No. 729,237 filed Oct. 4, 1976 and now abandoned.

This invention relates to a new tarpaulin cover system for use in a truck box. More particularly, the present invention relates to a tarpauline cover system suitable for vehicles such as dump trucks or the like, frequently used in hauling sand, gravel, rocks etc.

The suitability of truck covers has long been recognized as suitable means for reducing environmental pollution and danger to motorists following a dump truck or the like. It has also been recognized by many that overall structure of a tarpaulin system must meet several basic requirements in order to be really effective. Above all, a tarpaulin system should be relatively easy to install on an existing truck box without the need for considerable modifications of the parts thereof. Furthermore, the cover system must be simple and thus inexpensive to produce. Another requirement is a high reliability of the cover system. In other words, even when using the cover system in connection with coarse, bulky material such as rocks or the like, the cover system must not be subject to frequent damaging either by the hauled material or by the loading machinery, particularly in case of side loading. Another essential requirement, particularly for application in dump trucks, is the possibility of remote folding and unfolding of the cover.

Although the above requirements have long been established, the presently used and known devices of this type do not meet all of them.

Usually the meeting of one of the requirements results in failure to comply with another. The known cover systems use, for instance, tracks for mounting on the side walls of a dump truck box. Such tracks are frequently either subject to damage or too heavy and thus cumbersome to install, or both. A typical example of prior art in this field can be found in Canadian Pat. No. 895,191 issued Mar. 14, 1972 to W. Michel, U.S. Pat. No. 3,472,548 issued Oct. 14, 1969 to S. Comisac, U.S. Pat. No. 2,559,310 issued July 3, 1951 to McNavage and many other prior art references.

It is an object of the present invention to overcome the drawbacks of the known cover systems and to meet, to an optimum degree, all of the requirements as referred to above, in a manner superior to the known devices of this type.

In broad terms, the present invention solves the above problem by entirely avoiding conventional tracks in the actual sense of the word as referred to in prior art. In other words, the present invention utilizes the means for moving the tarpaulin along the truck box for simultaneously guiding of its components so as to maintain same in proper position with respect to the truck box.

According to the present invention, a tarpaulin cover system is provided for use in a truck box including two generally upright side walls and a front wall, such as a dump truck or the like. The system of the present invention belongs to the known type having a plurality of tarpaulin supporting rods including a leading rod and a plurality of intermediate rods, all of which extend across the truck box. The group of covers to which the present invention relates also is known as providing means for moving the rods along the top of the truck box to unfold or to fold the tarpaulin. Guide means for maintaining the ends of the rods in proximity to respective upper edges of the side walls belong to a further typical feature of the art to which the present invention relates. In the present invention, the guide means and the means for moving the rods consist of elongated, flexible means, such as a cable, arranged to be located along the top edge of each of the side walls generally parallel therewith. The leading rod is provided with means for fixedly securing the rod to the flexible means. The intermediate rods, on the other hand, are provided with means for securing the rods to the flexible means for slidable movement therealong. The elongated flexible means is arranged to be operatively connected to drive means for movement of the flexible means along the upper edges of the truck box. The invention thus results in a new and useful tarpaulin cover system which is not only extremely resistant to damage during the loading of bulky material or the like but which, at the same time, is relatively simple and thus inexpensive to produce. Furthermore, the inventive system is much easier to install to an existing dump truck box than the known devices of the above type.

The invention will now be described by way of a preferred embodiment thereof and by way of a slight modification of such embodiment, with reference to the accompanying drawings in which:

FIG. 1 is perspective view of a truck box wherein the rods and thus the cover of the box are arranged in a generally planar relationship with the top of the truck box;

FIG. 4 (on the sheet of FIG. 1) is a detail IV of FIG. 2;

FIG. 5 is a schematic detail of the embodiment of FIG. 1;

FIG. 6 is a partial perspective view of a modification of the embodiment of FIG. 1; and FIG. 7 is a schematic sectional detail similar to FIG. 5 but showing the embodiment of FIG. 6.

Figure 3:
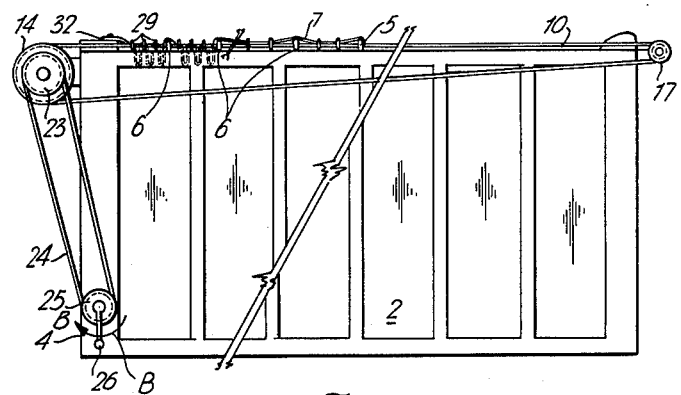
FIG. 3 is a schematic side view of FIG. 1.

The tarpaulin cover system shown in the drawings is applied to a truck box 1 which includes two side walls 2, 3 and a front wall 4. A plurality of rods 5, 6 is provided for supporting a flexible tarpaulin 7. The system of rods 5, 6 includes a leading rod 5 and a plurality of intermediate rods 6, as best seen from FIG. 1. The tarpaulin 7 is fixedly secured to the rods 5, 6, e.g. by cementing, stitching or the like. The rods 5, 6 extend across the truck box 1 and are arranged for movement along the top of the truck box 1, in the direction A (FIG. 2), to fold or to unfold the tarpaulin 7.

The system as shown in the drawings further comprises guide means for maintaining the ends of the rods in proximity to respective upper edges of the side walls 2, 3, one such upper edge 8 being shown in FIG. 4. The guide means is a system of flexible cables 9, 10, also being referred to as "elongated flexible means". As best seen from FIG. 4, the cable 10 is located along the top edge 8, generally parallel therewith.

It will be appreciated from FIG. 5 that the leading rod 5 is provided with a passage 11 through which passes the cable 10. The passage 11 is flattened at 11a so as to fixedly secure the ends of rod 5 to a first portion of each of the respective cables 9, 10.

On the other hand, as shown in FIG. 5, the intermediate rods 6 have each an eye 12 through which passes the respective cable 9, 10, so that the intermediate rods 6 are each slidable along the cables 9, 10. The cables 9, 10 are each operatively connected to drive means which will be described in greater detail hereinafter. In general terms, the drive means are arranged to move the cable along the upper edge 8 of the respective side wall 2, 3; the portions of the cable passing slidably through the eyes 12 can also be referred to as an embodiment of "second portions" of the flexible means.

It will be apparent from FIG. 4 that the overall length of each of the rods 5, 6 is such that the rod 6 can rest with its end portion 13 on the upper edge 8 of the side wall of the truck box 1.

Turning now to the above mentioned drive means, it is firstly to be appreciated that the elongated flexible means of the embodiment shown in the drawings are endless cables 9, 10 each arranged to train about a front pulley 14, 15 and about the respective rear pulley 16, 17. It will be appreciated that the pulleys 14–17 are secured to the upper end portions of the respective side walls 2, 3, of the truck box by brackets 18–21. As best seen from FIG. 2, the pulleys 14, 15 are both fixedly secured to an axle 22 so that they can only rotate in common. Fixedly secured to the left-hand end of the axle 22 is another pulley, also referred to as first pulley 23. The pulley 23 is operatively connected by a drive belt 24 with a second pulley 25 to which is fixedly secured to crank 26 for manually rotating the pulley 25. It will be appreciated that on turning the crank 26 the overall system of the pulleys can be driven. The second pulley 25 is provided with adjustment means (not shown) for adjusting the tension of belt 24.

Figure 2:
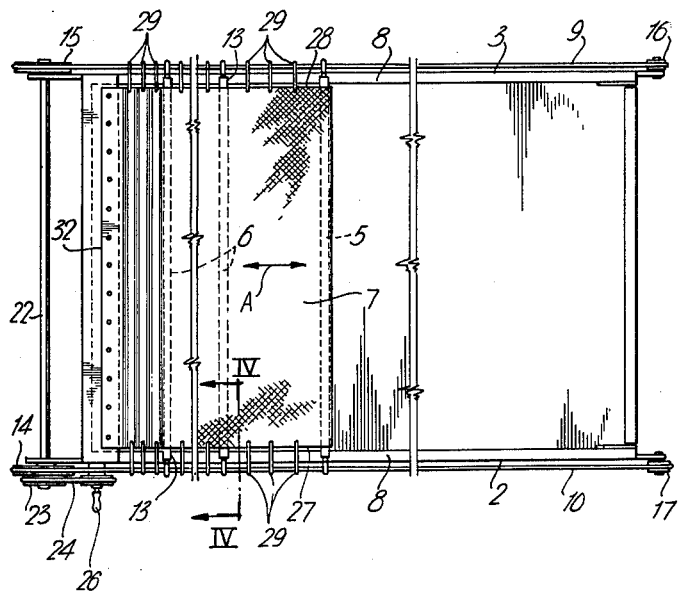
FIG. 2 is a schematic top view of FIG. 1.

With reference to FIG. 2, it will be seen that, in this embodiment, the tarpaulin 7 has two side edges 27, 28 which are generally coincident with the inside extremities of the top edges 8 of the respective side walls 2, 3, to span across the substantially entire width of the truck box, and to also allow for folding between the side walls. The tarpaulin 7 is provided at its edges 27, 28 with closed "S"-shaped connectors 29 which are equidistantly spaced between adjacent rods 6—6; 6-5. One eye of each of the connectors 29 is secured to the edge portion of the tarpaulin 7, while the other eye of each of such connectors slidably receives the respective cable 9, 10. The edge portions of the tarpaulin between adjacent supporting rods 5, 6 are thus additionally secured to the cables 9, 10 to reduce the overall height of the pleats of the tarpaulin when same is in a folded position.

Turning now to the embodiment of FIGS. 6 and 7, it will be seen that the rods 5′ 6′ of this embodiment are of the type of upwardly arched bows. The end portions of the rods 5′ 6′ are provided with tubular members, of which the tubular members 30 of the rod 5′ are flattened at 30a so as to fixedly secure the end portions of the rod 5′ to the cables 9, 10. On the other hand, the passages of tubular members 31 of the intermediate rods 6′ allow for free passage of the respective cables 9, 10. The purpose of the tubular members is to maintain the upwardly arched rods in a generally upright position. It will be appreciated that the number of cross bars 6 in the embodiment of FIG. 6 may be reduced in comparison with the embodiment of FIG. 1, to provide for a reasonably storage space when the tarpaulin is in folded position as the tubular members may prevent the rods from becoming as closely stacked as in the embodiment of FIG. 1. Due to the provision of the connectors 29 as referred to hereinabove, such reduction in the number of intermediate rods 6 does not pose a serious problem.

The tarpaulin 7 in FIG. 2 is shown in a partly unfolded position. It will be appreciated that the turning of crank 26 in the direction of the arrow B (FIG. 3) will result in the leading rod 5 (FIG. 2) moving to the right hand side, or towards the back of the truck box 1. The sections of tarpaulin between individual intermediate rods 6 are gradually unfolded until the leading rod 5 reaches the back of the truck box, whereupon the tarpaulin 7 is fully stretched to entirely cover the top of the truck box 1. The front end 32 of tarpaulin 7 is, of course, fixedly secured to the top edge of the front wall 4. When it is desired to fold the tarpaulin, the crank 26 is turned in a direction opposite to the direction B whereupon the leading rod 5 moves to the left of FIG. 2 such movement resulting, first, in creation of folding pleats between the leading rod 5 and the adjacent intermediate rod 6 etc. The overall sequence of the folding and unfolding of the tarpaulin 7 is much the same as in the known prior art and therefore need not be described in greater detail.

It will be appreciated that the present invention thus provides a simple and thus relatively inexpensive device in which the danger of a damage or inoperativeness during the loading, due to snow, ice, etc., is substantially reduced when compared with track systems due to the fact that the track-type guide system of prior art is eliminated and the flexible means of this invention is not subject to permanent deformation, clogging, etc., often encountered with known tracks. The device is simple to install on existing truck boxes as all that is required is the fixing of the brackets 18, 19, 20 and 21 to the box, together with the mounting of the drive pulley 25. In particular, it will be appreciated that the application of the present invention to an existing dump truck does not require any modification of the side walls of the existing truck, as is frequently the case of the known track-guided tarpaulin cover systems of prior art. The device according to the present invention is extremely simple to manufacture and thus substantially reduces the initial cost of the system.

Those skilled in the art will readily appreciate various modifications of the above embodiments. For instance, one might consider the replacement of the endless cables 9, 10 with two cables with reeling and unreeling arrangement at both ends of the truck box. When using the present invention with a drip-waterproof tarpaulin, it would obviously be of advantage to make the tarpaulin somewhat wider so as to cover the edges of the walls of the truck box. To secure the folding of such an embodiment, one might have to apply more power to the drive system. Another obvious modification would reside in automatic operation of the drive by providing an electric motor which might be operatively connected to the axle 22, to further simplify the overall arrangement. However, these and many other modifications of the device would still fall within the scope of the present invention as defined in the accompanying claims.

The embodiments of the present invention in which an exclusive property or privilege is claimed are defined as follows:

1. In combination with a truck box including a front wall and two generally upright side walls each having a generally horizontal top edge, a tarpaulin cover system including a tarpaulin; tarpaulin supporting rods fixedly secured to the tarpaulin and including a leading rod and a plurality of intermediate rods, said rods extending across said truck box; means for moving and guiding said rods along the top of said truck box to unfold or fold and to guide said tarpaulin and to maintain respective ends of the rods in proximity to the respective upper edges of said side wall, wherein:

(a) the length of each of said rods is in excess of the width of said box, while the width of said tarpaulin is less than the width of said box, each rod having two end portions disposed between the respective ends of the rod and a respective side edge porion of said tarpaulin, each of said end portions being fully exposed and resting on the top edge of the respective side wall of the box;

(b) said means for moving and guiding said rods including two flexible cable means each secured to the box, one of each of the cable means extending along the respective horizontal top edge in proximity to same and exteriorly of the box;

(c) each of the intermediate rods having at each end thereof a transverse passage means for slidably receiving the respective cable, the spacing between each passage means and the respective adjacent edge of the tarpaulin being greater than the thickness of the respective side wall at the respective top edge thereof;

(d) each of said cable means being fully exposed along generally the entire length thereof, whereby undesired accumulation of solid particles or the like in proximity to the respective cable is prevented, to improve reliability of operation of said system.

2. The combination of claim 1, wherein each of said cable means is an upper run of an endless cable training about a pair of pulleys secured for rotation at the front and the back of the box exteriorly thereof, respectively, said leading rod being fixedly secured to the respective cables; said combination further including means for coupling at least one of the respective pairs of pulleys secured at the front or at the back of the box, for simultaneous movement.

3. The combination of claim 2, further including connector means for slidably connecting a portion of the respective edge of the tarpaulin disposed between two adjacent rods, to the respective portion of the cable means.

4. The combination of claim 2, wherein said rods are each of the type of an upwardly arched box, each of said passage means being a tubular member fixedly secured to the respective ends of the respective rod and extending generally horizontally across the ends thereof, the length of each tubular member being greater than the width of the respective rod.

* * * * *